United States Patent
Belelie et al.

(10) Patent No.: US 8,545,002 B2
(45) Date of Patent: Oct. 1, 2013

(54) INK SET AND MANUFACTURING PROCESS FOR PHASE CHANGE INKS

(75) Inventors: Jennifer L. Belelie, Oakville (CA); Michelle N. Chretien, Mississauga (CA); Marcel P. Breton, Mississauga (CA); Barkev Keoshkerian, Thornhill (CA); Naveen Chopra, Oakville (CA); Peter G. Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 344 days.

(21) Appl. No.: 12/946,527

(22) Filed: Nov. 15, 2010

(65) Prior Publication Data

US 2012/0120145 A1    May 17, 2012

(51) Int. Cl.
*C09D 11/00*    (2006.01)

(52) U.S. Cl.
USPC ........................................................ 347/100

(58) Field of Classification Search
USPC ........................................................ 347/100
See application file for complete search history.

(56) References Cited

U.S. PATENT DOCUMENTS

| | | | |
|---|---|---|---|
| 7,279,587 B2 | 10/2007 | Odell et al. | |
| 7,559,639 B2 | 7/2009 | Belelie et al. | |
| 2007/0146431 A1* | 6/2007 | Nakamura et al. | 347/52 |
| 2008/0218570 A1 | 9/2008 | Kovacs et al. | |
| 2009/0038506 A1* | 2/2009 | Odell et al. | 106/31.13 |

OTHER PUBLICATIONS

Co-Pending U.S. Appl. No. 12/946,560, filed Nov. 15, 2010.
EFKA 4340 Brochure, "Your Value Improver for High Performance Pigments", Apr. 2005, pp. 1-4.
Disperbyk-2000 Disperbyk-2001, "High Molecular Weight Wetting and Dispersing Additives for Solvent-Borne Systems", Data Sheet W224, Issued Oct. 2009, pp. 1-2.
Office Action issued Mar. 28, 2012 in U.S. Appl. No. 12/946,560.
Office Action issued Apr. 8, 2013 in Canadian Patent Application No. 2,757,593.

* cited by examiner

*Primary Examiner* — Laura Martin
(74) *Attorney, Agent, or Firm* — Oliff & Berridge, PLC

(57) ABSTRACT

Curable phase change inks contain an ink vehicle, a pigment and a dispersant. A base ink set is of colored phase change inks that utilize the same dispersant, and also desirably contain the same amount of the dispersant. This allows the different color curable phase change inks to be mixed together while avoiding incompatibilities between each other, resulting in custom colors and a reliable expanded color gamut for the base ink set. Also, a method of forming images with the custom color curable phase change inks is disclosed.

7 Claims, 2 Drawing Sheets

INK SET AND MANUFACTURING PROCESS FOR PHASE CHANGE INKS

BACKGROUND

This disclosure is generally directed to curable phase change inks, methods of producing custom colors with the curable phase change inks, and use of the inks in methods for forming images, such as their use in ink jet printing. More particularly, this disclosure is directed to a set of phase change inks, in which each ink of the ink set utilizes the same dispersant among the different colors of the ink set and also contains the same amount of the dispersant, such that the different color phase change inks can be readily mixed together to form custom colors while avoiding incompatibilities between the inks, resulting in custom colors and an expanded color gamut.

The ability to provide custom color inks for printing needs is highly desirable. Highlight colors and spot colors are an important requirement for those with printing needs. The formation of custom colors with liquid dye-based inks to achieve a desired color is generally readily done, but in the case of pigmented inks, the situation is more complex due to the use of dispersants with the pigments, and the potential for interactions between dissimilar pigments and dispersants/additives across the colored inks (for example, C (cyan), Y (yellow), M (magenta), and K (black)) of the ink set.

Access to custom colors or expanded color gamut inks is particularly important in applications requiring low pile height, which prohibits multi-pass printing to achieve colors outside of the CYMK colors. Also, a customer that desires to formulate many custom colors for digital printing typically desires low inventory and small batch sizes of a custom color for short printing runs. This disclosure provides readily mixable pigmented inks or pigment concentrates, permitting ready custom color formation in pigmented phase change inks.

SUMMARY

Curable phase change inks have been developed. A desired property of these inks is the ability to melt mix together in order to produce custom colors (which herein also encompasses spot colors).

In embodiments, an ink set comprises a plurality of curable inks, each colored curable ink of the ink set being comprised of an ink vehicle, a gelling agent, a pigment and a dispersant. The dispersant is identical in each colored ink of the ink set. Also, the amount of dispersant is the same in each colored ink of the ink set.

In further embodiments, a method of making a custom color curable ink composition from a base ink set is described. The base ink set is comprised of inks wherein each colored ink of the base ink set includes an ink vehicle, a gelling agent, a pigment and a dispersant, and wherein each colored ink of the ink set has an identical dispersant and a same amount of the dispersant. At least two inks or ink concentrates from the base ink set are combined and heated to a temperature greater than the phase transition temperature of the inks or ink concentrates, so that the inks or ink concentrates are soft enough to be mixed using simple techniques. The melted inks or ink concentrates are then mixed.

An ink concentrate as used herein refers to an ink without a gelling agent in the ink. Thus, if an ink concentrate is used in the process, the mixed ink concentrates may then be further mixed with a gelling agent to form the end custom color ink. The addition of the gelling agent at a later stage allows the ink concentrates, which are liquid or pastes at room temperature, to be mixed at a lower temperature.

In still further embodiments, a method of forming an image is described. The image is formed with a base ink set, wherein each colored ink of the base ink set includes an ink vehicle, a pigment and a dispersant, and wherein each colored ink has an identical dispersant and a same amount of the dispersant. At least two inks from the base ink set are combined prior to printing. The separate inks are melted to a temperature greater than the inks' phase transition temperature, so that the inks melt. The melted inks are then mixed to form a custom color curable ink. The custom color curable phase change ink is then jetted onto an image receiving substrate to form an image. The image with the custom color is then optionally cooled in order to gel or solidify the ink, and the custom color ink is exposed to curing energy to cure the curable components of the phase change ink.

EMBODIMENTS

Figure 1:
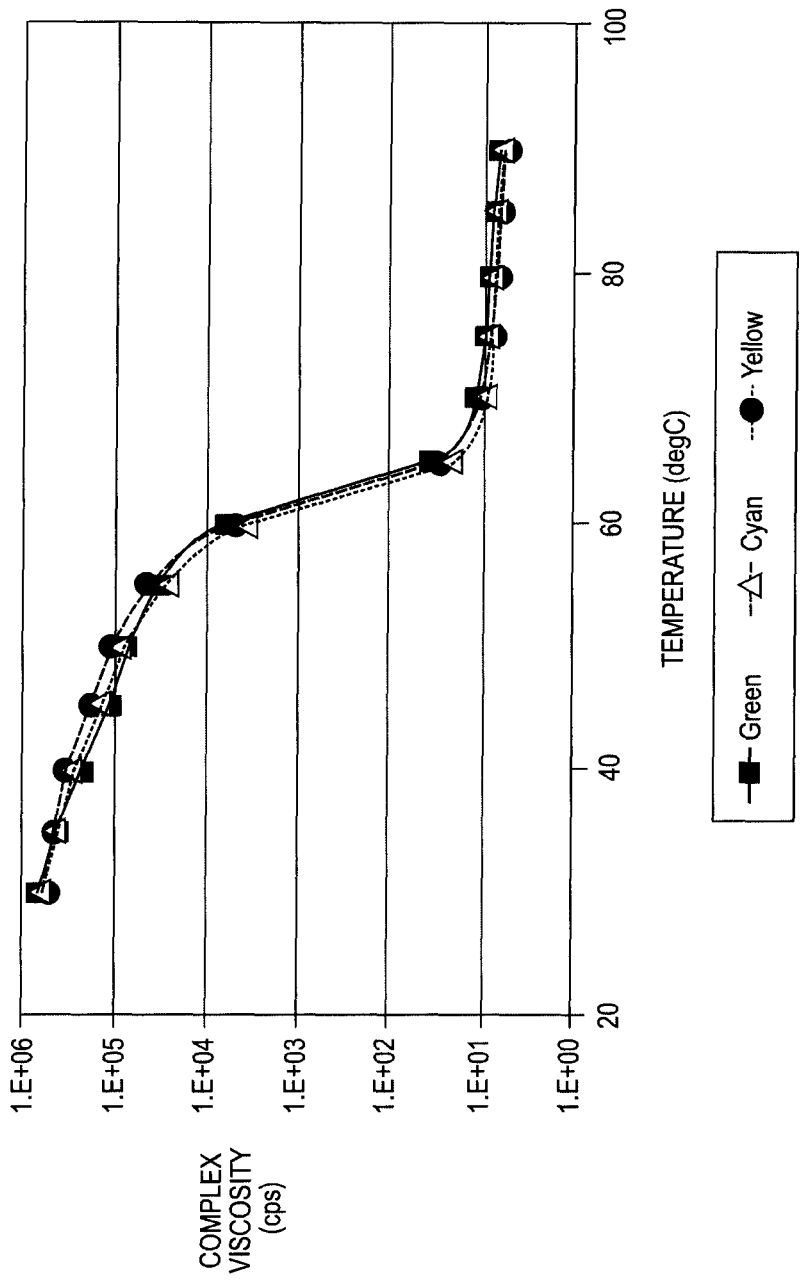
FIG. 1 is a graphical representation of the dynamic temperature step rheology curve for melt mixed radiation curable phase change inks and comparative inks.

The inks of the ink sets described herein are curable phase change inks, desirably radiation curable phase change inks, for example curable by exposure to UV radiation. The inks are in a solid state at room temperature or ambient temperature (around 25° C.). To jet the inks, the inks are heated above their melt temperature to change to a liquid or jettable phase.

The base ink set herein includes at least two, and desirably three or four, phase change inks of different colors. A colored ink herein is an ink that exhibits a perceptible color to a viewer's naked eye, for example as a result of the ink including a colorant that exhibits the perceptible color. Desirably, a base ink set is comprised of four colored inks representing the CYMK colors. However, a base ink set can also be comprised of different colors, such as, blue, green, red, violet, orange, white and black. Each colored ink of the base ink set is comprised of an ink vehicle, a pigment and a dispersant. Each ink may utilize a different ink vehicle or may utilize the same ink vehicle. The dispersant of each colored ink of the ink set must be the same dispersant for all the colored inks in the ink set. Also, the amount of dispersant in each colored ink of the ink set desirably is present in the colored inks in the same amount.

The ink set may also include a pigmentless (colorless) ink that may or may not contain the same dispersant, optionally in the same amount or a different amount (if present), as the colored inks of the base ink set. The pigmentless phase change ink can be used in forming a custom color ink that is a lighter shade in color, by mixing the pigmentless ink with one or more colored inks of the ink set, or may be used in cleaning of an ink jet apparatus.

Using the same pigment dispersant in the same amount across all colored inks of an ink set can eliminate interactions between the dispersants and/or unintended pigment-dispersant interactions when the inks are mixed in forming a custom color.

The phase change inks are desirably radiation curable, such as curable by UV-light.

The curable inks of the ink set herein each comprise an ink vehicle. The ink vehicle contains curable components of the inks, and also acts as a carrier for the pigment and dispersant of the inks.

In embodiments, the ink vehicle comprises a curable monomer or oligomer. The ink vehicle may also include a curable wax, and other optional additives such as a photoinitiator.

The term "curable" refers, for example, to a component of the ink vehicle, such as the monomer or oligomer, being polymerizable, that is, a component that may be cured via polymerization, including, for example, free radical routes, and/or in which polymerization is photoinitiated through use of a radiation sensitive photoinitiator.

Thus, for example, the term "radiation curable" is intended to cover all forms of curing upon exposure to a radiation source, including light and heat sources and including in the presence or absence of initiators. Example radiation curing routes include, for example, curing using ultraviolet (UV) light, for example having a wavelength of 200-400 nm, such as in the presence of photoinitiators and/or sensitizers, curing using e-beam radiation, such as in the absence of photoinitiators, curing using thermal curing, in the presence or absence of high temperature thermal initiators (and which are generally largely inactive at the jetting temperature), and appropriate combinations thereof.

Upon exposure to a suitable source of curing energy, for example, ultraviolet light, electron beam energy, or the like, the curable component of the ink and/or a photoinitiator absorbs the energy and sets into motion a reaction that converts the jetted ink composition into a cured material. The curable component of the ink typically includes functional groups that polymerize during exposure to the curing source to readily crosslink, forming a polymer network. This polymer network provides a printed image with, for example, durability, thermal and light stability, and scratch and smear resistance. Thus, the ink composition is particularly well-suited for ink-based images printed on substrates that may be subjected to heat or sunlight, because the composition provides a printed image that is resistant to cracking and fading and provides image permanence.

The ink vehicle may include one or more reactive oligomers, one or more reactive monomers, or a combination of one or more reactive oligomers and one or more reactive monomers. However, in embodiments, the ink vehicle includes at least one reactive (curable) monomer or oligomer, and optionally one or more additional reactive (curable) monomers and/or one or more reactive (curable) oligomers. The curable monomer and/or oligomer of the ink may variously function as a viscosity reducer, as a binder when the composition is cured, as an adhesion promoter, and as a crosslinking agent, for example. Suitable monomers and/or oligomers can have a low molecular weight, low viscosity, and low surface tension and comprise functional groups that undergo polymerization upon exposure to radiation such as UV light in the presence of a suitable initiator. The ink vehicle may be the same or different among the inks of the ink set, and thus the curable monomers and/or oligomers may be the same or different among the inks of the ink set.

Suitable radiation, such as UV, curable monomers and oligomers include, for example, acrylated esters, acrylated polyesters, acrylated ethers, acrylated polyethers, acrylated epoxies, urethane acrylates, and pentaerythritol tetraacrylate. Specific examples of suitable acrylated monomers include monoacrylates, diacrylates, and polyfunctional alkoxylated or polyalkoxylated acrylic monomers comprising one or more di- or tri-acrylates. Suitable monoacrylates are, for example, cyclohexyl acrylate, 2-ethoxy ethyl acrylate, 2-methoxy ethyl acrylate, 2-(2-ethoxyethoxy)ethyl acrylate, stearyl acrylate, tetrahydrofurfuryl acrylate, octyl acrylate, lauryl acrylate, behenyl acrylate, 2-phenoxy ethyl acrylate, tertiary butyl acrylate, glycidyl acrylate, isodecyl acrylate, benzyl acrylate, hexyl acrylate, isooctyl acrylate, isobornyl acrylate, butanediol monoacrylate, ethoxylated phenol monoacrylate, oxyethylated phenol acrylate, monomethoxy hexanediol acrylate, beta-carboxy ethyl acrylate, dicyclopentyl acrylate, carbonyl acrylate, octyl decyl acrylate, ethoxylated nonylphenol acrylate, hydroxyethyl acrylate, hydroxyethyl methacrylate, tricyclodecane dimethanol diacrylate, dioxane glycol diacrylate, and the like. Suitable polyfunctional alkoxylated or polyalkoxylated acrylates are, for example, alkoxylated, such as ethoxylated or propoxylated, variants of the following: neopentyl glycol diacrylates, butanediol diacrylates, trimethylolpropane triacrylates, glyceryl triacrylates, 1,3-butylene glycol diacrylate, 1,4-butanediol diacrylate, diethylene glycol diacrylate, 1,6-hexanediol diacrylate, tetraethylene glycol diacrylate, triethylene glycol diacrylate, tripropylene glycol diacrylate, polybutanediol diacrylate, polyethylene glycol diacrylate, propoxylated neopentyl glycol diacrylate, ethoxylated neopentyl glycol diacrylate, polybutadiene diacrylate, and the like.

A suitable monomer is a propoxylated neopentyl glycol diacrylate, such as, for example, SR9003 (Sartomer Co., Inc., Exton, Pa.). Other suitable reactive monomers are likewise commercially available from, for example, Sartomer Co., Inc., Henkel Corp., Radcure Specialties, and the like. Specific examples of suitable acrylated oligomers include, for example, acrylated polyester oligomers, such as CN2262 (Sartomer Co.), EB 812 (Cytec Surface Specialties), EB 810 (Cytec Surface Specialties), CN2200 (Sartomer Co.), CN2300 (Sartomer Co.), and the like, acrylated urethane oligomers, such as EB270 (UCB Chemicals), EB 5129 (Cytec Surface Specialties), CN2920 (Sartomer Co.), CN3211 (Sartomer Co.), and the like, and acrylated epoxy oligomers, such as EB 600 (Cytec Surface Specialties), EB 3411 (Cytec Surface Specialties), CN2204 (Sartomer Co.), CN110 (Sartomer Co.), and the like; and pentaerythritol tetraacrylate oligomers, such as SR399LV (Sartomer Co.) and the like.

The at least one radiation curable monomer and/or oligomer can be cationically curable, radically curable, or the like.

The curable monomer and/or oligomer is included in the ink in an amount of, for example, about 20 to about 90% by weight of the ink, such as about 30 to about 80% by weight of the ink, or about 50 to about 70% by weight of the ink.

The ink also includes at least one gelling agent that exhibits gel-like behavior that undergoes a relatively sharp increase in viscosity over a relatively narrow temperature range when dissolved in the ink vehicle. In embodiments, an ink concentrate can be produced, which is an ink without a gelling agent. The gelling agents can be mixed with the ink concentrates at a later time to produce a completed ink formulation.

Any suitable gelling agent can be used for the ink vehicle. The gelling agent may be selected from, for example, the gelling agents disclosed in U.S. Pat. No. 7,279,587, incorporated herein by reference in its entirety, such as a compound of the formula

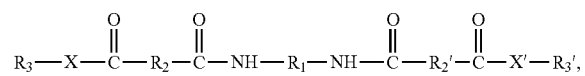

wherein:

$R_1$ is:

(i) an alkylene group (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), having from 1 to about 12 carbon atoms, such as from 1 to 4 carbon atoms or 1 to 2 carbon atoms, although the number of carbon atoms can be outside of these ranges, (ii) an arylene group (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), having from 5 to about 14 carbon atoms, such as from 5 to 12 carbon atoms or 5 to 10 carbon atoms, although the number of carbon atoms can be outside of these ranges, (iii) an arylalkylene group (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), having from 6 to about 32 carbon atoms, such as from 6 to 22 carbon atoms or 7 to 22 carbon atoms, although the number of carbon atoms can be outside of these ranges, or (iv) an alkylarylene group (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), having from 6 to about 32 carbon atoms, such as from 6 to 22 carbon atoms or 7 to 22 carbon atoms, although the number of carbon atoms can be outside of these ranges, wherein the substituents on the substituted alkylene, arylene, arylalkylene, and alkylarylene groups can be, for example, halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2'$ each, independently of the other, are selected from the group consisting of:

(i) alkylene groups having from 1 to about 54 carbon atoms, such as from 1 to 36 carbon atoms or 1 to 24 carbon atoms, although the number of carbon atoms can be outside of these ranges, (ii) arylene groups having from 5 to about 14 carbon atoms, such as from 5 to 10 carbon atoms or 6 to 7 carbon atoms, although the number of carbon atoms can be outside of these ranges, (iii) arylalkylene groups, having from 6 to about 32 carbon atoms, such as from 6 to 22 carbon atoms or 7 to 22 carbon atoms, although the number of carbon atoms can be outside of these ranges, or (iv) alkylarylene groups, having from 6 to about 32 carbon atoms, such as from 6 to 22 carbon atoms or 7 to 22 carbon atoms, although the number of carbon atoms can be outside of these ranges, although the number of carbon atoms can be outside of these ranges, wherein the substituents on the substituted alkylene, arylene, arylalkylene, and alkylarylene groups are the same as the above description for alkylarylene groups;

$R_3$ and $R_3'$ each, independently of the other, are either:

(a) photoinitiating groups, such as groups derived from 1-(4-(2-hydroxyethoxy)phenyl)-2-hydroxy-2-methylpropan-1-one, of the formula

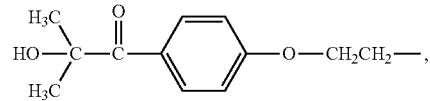

groups derived from 1-hydroxycyclohexylphenylketone, of the formula

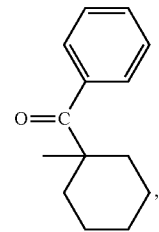

groups derived from 2-hydroxy-2-methyl-1-phenylpropan-1-one, of the formula

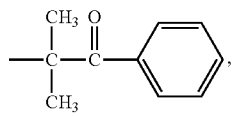

groups derived from N,N-dimethylethanolamine or N,N-dimethylethylenediamine, of the formula

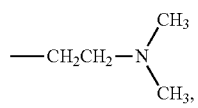

or the like, or:

(b) a group that is:

(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group), having from 2 to 100 carbon atoms, such as from 3 to 60 carbon atoms or 4 to 30 carbon atoms, although the number of carbon atoms can be outside of these ranges, (ii) an aryl group (including substituted and unsubstituted aryl groups, and wherein heteroatoms, such as oxygen, nitrogen, sulfur, silicon, phosphorus, boron, and the like either may or may not be present in the aryl group), having from 5 to about 100 carbon atoms, such as from 6 to 60 carbon atoms or 7 to 30 carbon atoms, although the number of carbon atoms can be outside of these ranges, such as phenyl or the like, (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group), having from 6 to about 100 carbon atoms, such as from 7 to 60 carbon atoms or 8 to 30 carbon atoms, although the number of carbon atoms can be outside of these ranges, such as benzyl or the like, or (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group), having from 6 to about 100 carbon atoms, such as from 7 to 60 carbon atoms or 8 to 30 carbon atoms, although the number of carbon atoms can be outside of these ranges, such as tolyl or the like, wherein the substituents on the substituted alkyl, arylalkyl, and alkylaryl groups can be, for example, halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring;

provided that X and X' each, independently of the other, is an oxygen atom or a group of the formula —$NR_4$—, wherein $R_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, having from 1 to about 100 carbon atoms, such as from 2 to 60 carbon atoms or 3 to 30 carbon atoms, although the number of carbon atoms can be outside of these ranges, (iii) an aryl group, including substituted and unsubstituted aryl groups, and wherein heteroatoms either may or may not be present in the aryl group, having from 5 to about 100 carbon atoms, such as from 6 to 60 carbon atoms or 7 to 30 carbon atoms, although the number of carbon atoms can be outside of these ranges, (iv) an arylalkyl group, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, having from 6 to about 100 carbon atoms, such as from 7 to 60 carbon atoms or 8 to 30 carbon atoms, although the number of carbon atoms can be outside of these ranges, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, having from 6 to about 100 carbon atoms, such as from 7 to 60 carbon atoms or 8 to 30 carbon atoms, although the number of carbon atoms can be outside of these ranges, wherein the substituents on the substituted alkyl, aryl, arylalkyl, and alkylaryl groups can be, for example, halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

In embodiments, the gelling agent of the ink is a mixture of amide gelling agents of the general structures 9
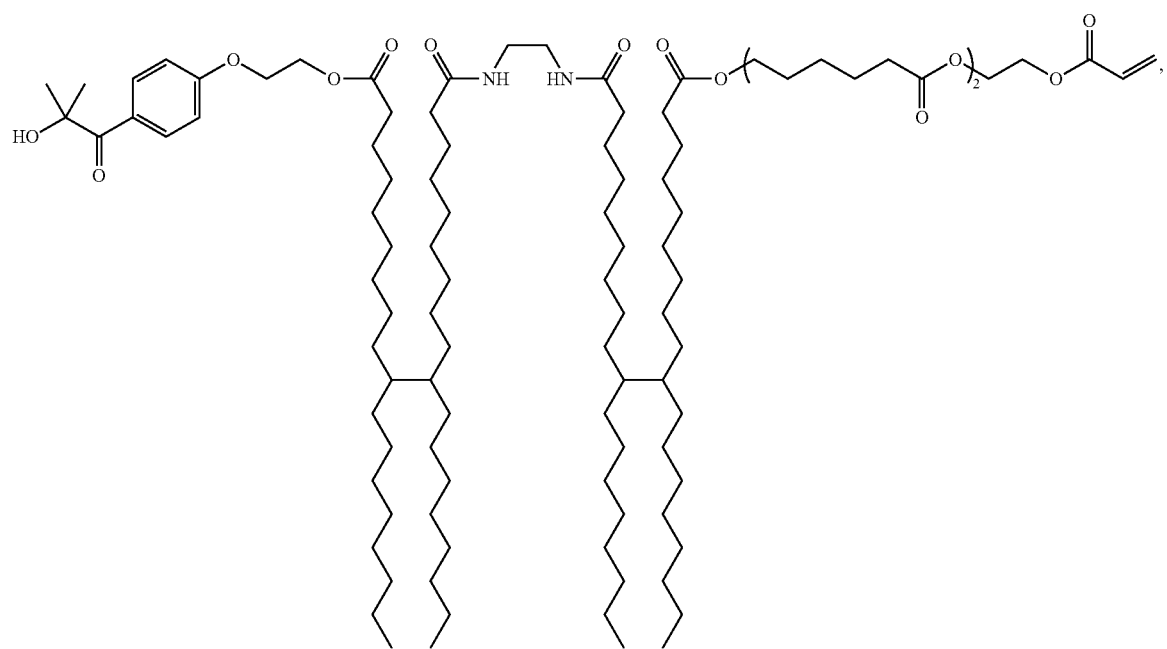
10
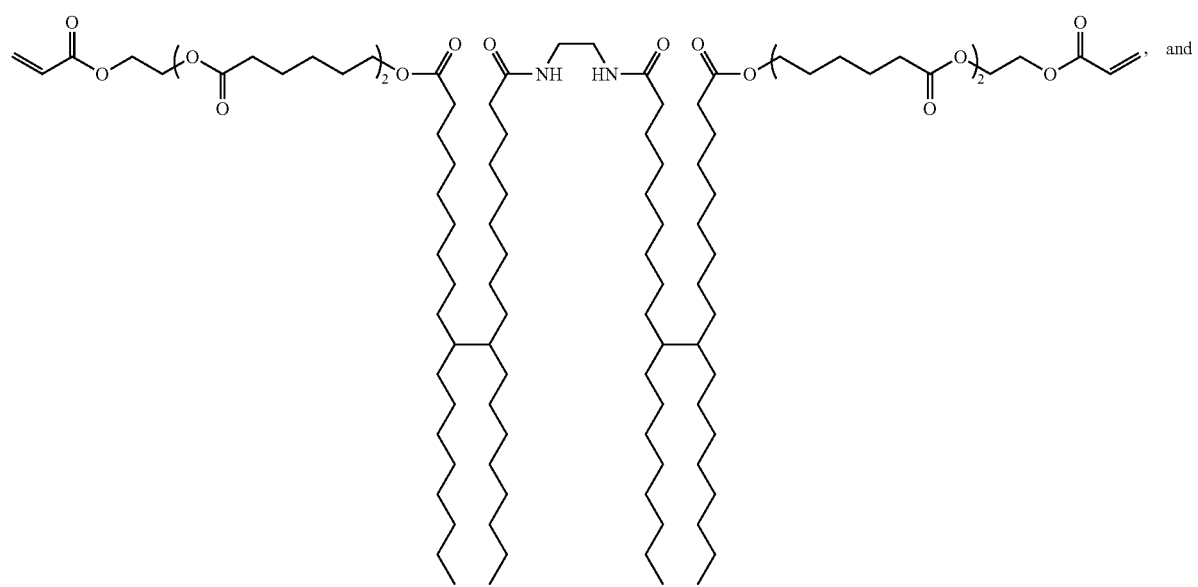

-continued

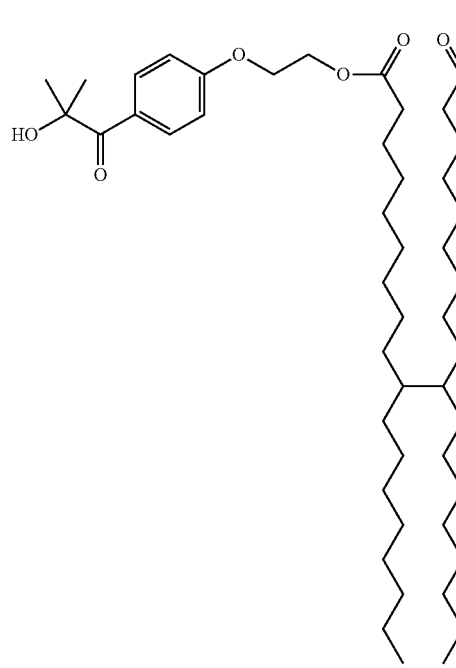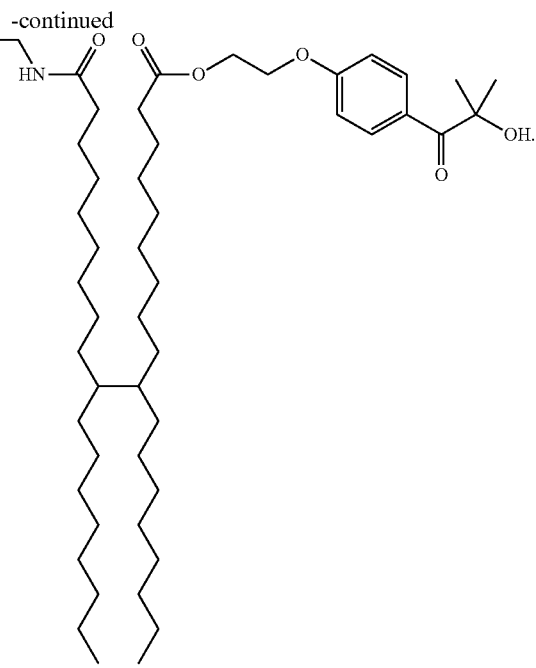

The ink can include the gelling agent, or gellant, in any suitable amount, such as about 1% to about 30% by weight of the ink, for example in an amount of about 2% to about 20% by weight of the ink, such as about 5% to about 12% by weight of the ink.

The ink vehicles of the ink set can also include a wax, optionally a curable wax. The term "wax" includes, for example, any of the various natural, modified natural, and synthetic materials commonly referred to as waxes. A wax is desirably solid at room temperature, specifically at 25° C. A curable wax may be any wax component that is miscible with the other components of the ink and that will polymerize with the other curable components of the ink, such as the curable monomer or oligomer. Inclusion of the wax may promote an increase in viscosity of the ink as it cools from the jetting temperature.

Suitable examples of curable waxes include, for example, those waxes that include or are functionalized to include curable groups. The curable groups may include, for example, acrylate, methacrylate, alkene, allylic ether, epoxide, oxetane, and the like. These waxes can be synthesized by the reaction of a wax equipped with a transformable functional group, such as carboxylic acid or hydroxyl.

Suitable examples of hydroxyl-terminated polyethylene waxes that may be functionalized with a curable group include, for example, mixtures of carbon chains with the structure $CH_3-(CH_2)_n-CH_2OH$, where there is a mixture of chain lengths, n, where the average chain length can be in the range of about 16 to about 50, and linear low molecular weight polyethylene, of similar average chain length. Suitable examples of such waxes include, but are not limited to, the UNILIN® series of materials such as UNILIN® 350, UNILIN® 425, UNILIN® 550 and UNILIN® 700 with Mn (number average molecular weight) of approximately equal to 375, 460, 550 and 700 g/mol, respectively. All of these waxes are commercially available from Baker-Petrolite. A desirable wax herein is an acrylated UNILIN wax.

The wax may be included in the ink composition in an amount of from, for example, about 1% to about 25% by weight of the ink, such as about 2% to about 15% or about 3% to about 10% or about 4% to about 6% by weight of the ink.

The ink vehicle may also include other additives. For example, the ink vehicle may further comprise an initiator, such as a photoinitiator, that initiates polymerization of curable components of the ink, including the curable monomer and the curable wax. The initiator should be soluble in the ink vehicle. The initiator may be a UV-activated photoinitiator.

The initiator can be a radical initiator. Examples of radical photoinitiators include benzophenone derivatives, benzyl ketones, monomeric hydroxyl ketones, α-amino ketones, acyl phosphine oxides, metallocenes, benzoin ethers, benzil ketals, α-hydroxyalkylphenones, α-aminoalkylphenones, acylphosphine photoinitiators sold under the trade designations of IRGACURE® and DAROCUR® from Ciba, isopropyl thioxanthenones, and the like, and mixtures and combinations thereof. Specific examples include 1-hydroxycyclohexylphenylketone, benzophenone, benzophenone derivatives, 2-benzyl-2-(dimethylamino)-1-(4-(4-morpholinyl)phenyl)-1-butanone, 2-methyl-1-(4-methylthio)phenyl-2-(4-morphorlinyl)-1-propanone, diphenyl-(2,4,6-trimethylbenzoyl)phosphine oxide, phenyl bis(2,4,6-trimethylbenzoyl)phosphine oxide, benzyl-dimethylketal, isopropylthioxanthone, 2,4,6-trimethylbenzoyldiphenylphosphine oxide (available as BASF LUCIRIN TPO®), 2,4,6-trimethylbenzoylethoxyphenylphosphine oxide (available as BASF LUCIRIN TPO-L®), bis(2,4,6-trimethylbenzoyl)-phenyl-phosphine oxide (available as Ciba IRGACURE® 819) and other acyl phosphines, 2-methyl-1-(4-methylthio)phenyl-2-(4-morphorlinyl)-1-propanone (available as Ciba IRGACURE® 907) and 1-(4-(2-hydroxyethoxy)phenyl)-2-hydroxy-2-methylpropan-1-one (available as Ciba IRGACURE® 2959), 2-benzyl 2-dimethylamino 1-(4-morpholinophenyl)butanone-1 (available as Ciba IRGACURE® 369), 2-hydroxy-1-(4-(4-(2-hydroxy-2-methylpropionyl)-benzyl)-phenyl)-2-methylpropan-1-one (available as Ciba IRGACURE® 127), 2-dimethylamino-2-(4-methylbenzyl)-1-(4-morpholin-4-ylphenyl)-butanone (available as Ciba IRGACURE® 379), titanocenes, isopropylthioxanthenones, 1-hydroxy-cyclohexylphenylketone, benzophenone, 2,4,6-trimethylbenzophenone, 4-methylbenzophenone, diphenyl-(2,4,6-trimethylbenzoyl) phosphine oxide, 2,4,6-trimethylbenzoylphenylphosphinic acid ethyl ester, oligo(2-hydroxy-2-methyl-1-(4-(1-methylvinyl)phenyl)propanone), 2-hydroxy-2-methyl-1-phenyl-1-propanone, benzyl-dimethylketal, and the like, as well as mixtures thereof. In an embodiment, the ink contains an α-amino ketone, such as, for example, IRGACURE® 379 (Ciba Specialty Chemicals), 2-hydroxy-1-(4-(4-(2-hydroxy-2-methyl-propionyl)-benzyl)-phenyl)-2-methylpropan-1-one, such as, for example, IRGACURE® 127 (Ciba Specialty Chemicals), bis(2,4,6-trimethylbenzoyl)-phenylphosphineoxide, such as, for example, IRGACURE® 819 and 2-isopropyl-9H-thioxanthen-9-one, such as, for example, DAROCUR® ITX (Ciba Specialty Chemicals).

The initiator may be a cationic initiator. Examples of suitable cationic photoinitiators include aryldiazonium salts, diaryliodonium salts, triarysulfonium salts, triarylselenonium salts, dialkylphenacylsulfonium salts, triarylsulphoxonium salts and aryloxydiarylsulfonium salts.

The total amount of initiator included in the ink may be, for example, about 0.5 to about 15%, such as about 1 to about 12%, or about 2 to about 10% by weight of the ink.

The ink vehicle of one or more inks of the ink set may contain additional optional additives. Optional additives may include surfactants, light stabilizers, which absorb incident UV radiation and convert it to heat energy that is ultimately dissipated, antioxidants, optical brighteners, which can improve the appearance of the image and mask yellowing, thixotropic agents, dewetting agents, slip agents, foaming agents, antifoaming agents, flow agents, other non-curable waxes, oils, plasticizers, binders, electrical conductive agents, fungicides, bactericides, organic and/or inorganic filler particles, leveling agents, which are agents that create or reduce different gloss levels, opacifiers, antistatic agents, dispersants, and the like. The inks may include, as a stabilizer, a radical scavenger, such as IRGASTAB UV 10 (Ciba Specialty Chemicals, Inc.). The inks may also include an inhibitor, such as a hydroquinone, to stabilize the composition by prohibiting or, at least, delaying, polymerization of the oligomer and monomer components during storage, thus increasing the shelf life of the composition. However, additives may negatively affect cure rate, and thus care must be taken when formulating a composition using optional additives.

Any desired or effective pigment may be employed in the colored inks of the ink set, including pigment, mixtures of pigments, and the like, provided that the pigment may be dispersed in the ink vehicle.

Examples of suitable pigments include Violet PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical 249-0592); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); SUNFAST® Blue 15:3 (Sun Chemical 249-1284); PALIOGEN Red 3340 (BASF); SUNFAST® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); SPECTRA PAC® C Orange 16 (Sun Chemical 276-3016); HELIOGEN Blue K6902, K6910 (BASF); SUNFAST® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); carbon blacks such as REGAL 330™ (Cabot), Carbon Black 5250, Carbon Black 5750 (Columbia Chemical); titanium oxide pigments such as Ti-Pure® R-108, Ti-Pure® R-104, Ti-Pure® R-103, Ti-Pure® R-102, Ti-Pure® R-700, Ti-Pure® R-706, Ti-Pure® R-760, Ti-Pure® R-900, Ti-Pure® R-960 (DuPont Titanium Technologies); 2020, 2063, 2090, 2310, 2450 (Kronos Inc.); and Tiona® 595, Tiona® 568, Tiona® RCL-6, Tiona® RCL-9, Tiona® 696 (Millennium Inorganic Chemicals); mixtures thereof and the like.

The pigment may be included in the ink in any suitable amount, such as an amount of from about 0.1 to about 25% by weight of the ink, such as about 0.5 or about 20% to about 1 or about 15% by weight of the ink.

As the dispersant of the colored inks of the ink set, a dispersant having portions or groups that have an excellent adsorption affinity for the various pigments used in the colored inks of the ink set, and also having portions or groups that allow for dispersion within the ink vehicle are desired. Selection of an appropriate dispersant for all of the colored inks of the ink set may require trial and error evaluation, capable by those of ordinary skill in the art, due to the unpredictable nature of dispersant/pigment combinations.

As example dispersants, random and block copolymers may be suitable. A particularly desirable block copolymer is an amino acrylate block copolymer, for example including an amino or amino acrylate block A and an acrylate block B, the acrylate portions permitting the dispersant to be stably and well dispersed in the ink vehicle while the amino portions adsorb well to pigment surfaces. Commercially available examples of block copolymer dispersants that have been found suitable for use herein are DISPERBYK-2001 (BYK Chemie GmbH) and EFKA 4340 (Ciba Specialty Chemicals).

The base ink set must be comprised of colored inks that each includes the same dispersant or same combination of dispersants, such that there is no difference among the dispersant component in each of the colored inks of the ink set. Any dispersant described above may be used in the colored inks of an ink set, but each colored ink of the ink set must be comprised of that same dispersant.

Furthermore, each colored ink of the ink set desirably includes the same total amount of the dispersant compared to the other colored inks of the ink set. The dispersant may be included in each colored ink of the ink set in any suitable amount. For example, the dispersant may be added to the ink from about 20 to about 200% by weight relative to the pigment, such as from about 20 to about 150% by weight relative to the pigment or from about 20 to 100% by weight relative to the pigment.

The pigment and dispersant may be added to the ink as a dispersion of the pigment and dispersant. The pigment dispersion may have a solids percentage of from about 5 to about 50%, such as from about 5 to about 40% or from about 10 to about 40%.

The curable phase change inks are solid or solid-like at room temperature. It is desired for the curable phase change inks to have a viscosity of less than about 50 mPas, such as less than about 30 mPas, for example from about 3 to about 30 mPas, from about 5 to about 20 mPas or from about 8 to about 15 mPas, at the temperature of jetting of the ink. Thus, the inks are jetted in a liquid state, which is achieved by applying heat to melt the ink prior to jetting. The inks are desirably jetted at low temperatures, in particular at temperatures below about 120° C., for example from about 50° C. to about 110° C. or from about 60° C. to about 110° C. The inks are thus ideally suited for use in piezoelectric ink jet devices.

When a gelling agent is used in the inks, the temperature at which the ink forms the gel state is any temperature below the jetting temperature of the ink, for example any temperature that is about 5° C. or more below the jetting temperature of the ink. In embodiments, the gel state may be formed at temperatures from about 25° C. to about 100° C., such as from about 40° C. to about 80° C. There is a rapid and large increase in ink viscosity upon cooling from the jetting temperature, at which the ink is in a liquid state, to the gel temperature, at which the ink is in the gel state. The viscosity increase is, for example, about at least a $10^{2.5}$-fold increase in viscosity.

Each colored ink of the base ink set may be prepared by any desired or suitable method, as long as the dispersant and amount of dispersant is the same for each colored ink of the base ink set. For example, components of each individual ink may be mixed together, followed by heating the mixture to a temperature near or above the melting point of the ink, for example to a temperature of from about 60° to about 100° C., and stirring until a homogenous ink composition is obtained, followed by cooling the ink to ambient temperature, for example from about 20° C. to about 25° C. As described above, the pigment and dispersant are desirably mixed separate from the other components and added into the ink as a dispersion during the manufacture. The manufacture should be conducted at a temperature below a temperature at which the ink would prematurely, and undesirably, thermally polymerize.

The colored inks of the ink set are readily miscible with each other without precipitation issues, and thus custom colors of the curable phase change inks can be produced by way of mixing at least two differently colored inks of the base ink set. The custom color is desirably formed by melting the respective inks of the ink set and mixing the inks together.

Customers who desire a particular custom color in printing with pigmented phase change inks typically had to develop separate custom color formulations so that the ink exhibited good dispersability, because the different inks of the base ink set typically had compatibility issues, and thus, mixed custom colors could not be made by simply mixing the inks of the ink set. Herein, different color pigmented phase change inks have excellent compatibility with each other due to the identical dispersant, and desirably also the same amount of the dispersant, in each colored ink of the base ink set.

A method of producing a custom color herein requires a determination of what custom color to produce and determining the ratio at which at least two curable phase change inks from the base ink set are to be mixed to produce the custom color. Next, depending on the total amount of the custom color desired, the required amounts of the at least two curable phase change inks are fed to a mixing vessel. The at least two curable phase change inks are heated to a temperature near or greater than the melting or phase transition temperature of the curable phase change inks, for example from about 60° C. to about 100° C., and then mixed, causing the inks to combine and achieve the custom color. The custom color ink composition may then be cooled to ambient temperature, or directly jetted without cooling.

A custom color herein is any shade or color different from the known base colors of ink sets, for example the base colors of cyan, yellow, magenta and optionally black and/or red, green, blue, orange, violet, white and optionally black. The different shade or color of the custom color is achieved by mixing at least two colored inks of the ink set, or at least one colored ink of the ink set and a pigmentless ink of the ink set.

The custom color curable phase change inks can include a specific amount of black color curable phase change ink. The addition of the black ink causes the custom color curable phase change ink to be darker in color. Thus, the more black ink included in the mixture will create a darker color custom color curable phase change ink. Additionally, the custom color curable phase change inks can include a specific amount of pigmentless curable phase change ink. The addition of the pigmentless ink causes the custom color curable phase change ink to be lighter in color. Thus, the more pigmentless ink included in the mixture will create a lighter color custom color curable phase change ink. The base ink set thus may include a pigmentless (colorless) ink.

The mixing of the inks to form custom colors may be done outside of an ink jet device. For example, the mixing may be done at a manufacturing site. The custom color mixed ink may then be shipped directly to customers in desired amounts.

The method of producing a custom color curable phase change ink may also be done concurrently with the packaging process. The method is similar to that described above, with the as-mixed custom color being placed into a printer cartridge when in a liquid state. The ink cartridge containing the custom color can then be provided to customers.

The method of producing custom color curable phase change ink can also advantageously be done within an ink jet device itself, using a modified ink delivery system to produce custom color curable phase change ink in-line and on demand. The modified ink delivery system contains a mixing chamber. The in-line method forms the custom color curable phase change ink on demand by introducing the required two or more inks from the base ink set into the mixing chamber. The mixing chamber heats and mixes the inks to form the custom color curable ink. The custom color curable ink is then provided to an ink jet head for jetting onto a substrate via the ink jet device.

When the custom color curable ink is produced within the ink jet device itself, advantages are realized. First, the production of custom color curable ink within the ink jet device allows the user to form only the needed amount of custom color ink, which may be a small quantity. Comparatively, other ink jet devices, which cannot produce custom color, inks require the user to produce the custom color inks on a batch by batch basis, which may lead to large unused quantities. Second, any unused custom color curable ink in a mixing chamber of the device can be further mixed with unused inks of the base ink set or other unused custom color inks to produce black color ink that may be used in the device. This reduces ink waste.

A method of making a custom color curable ink composition may also involve using ink concentrates. The method is similar to that described above, but uses ink concentrates free of gelling agents instead of end inks. At least two ink concentrates are combined in a manner similar to that described above. After the ink concentrates are mixed to form a custom color ink concentrate, a gelling agent can then be added to the ink concentrates to form the custom color ink. The addition of the gelling agent at a later stage allows the ink concentrates, which are liquids or pastes at room temperature, to be mixed at a lower temperature compared to a concentrate containing a gelling agent, thereby utilizing less energy in the ink formation process.

The inks described herein may be applied to a substrate to form an image. In order to apply the inks to a substrate, the inks are heated to a temperature that causes the inks to melt. The melted inks may then be jetted, and then optionally cooled to gel and/or solidify.

In embodiments, the method comprises providing a curable ink described herein; applying the curable ink to the substrate via an ink jet to form an image; and exposing the curable ink to curing energy to cure the ink. During the curing process, the curable monomer and the curable wax, optionally with other curable components, are polymerized to form a cured image.

In embodiments, a pigmentless curable phase change ink can be used for cleaning printerheads and/or ink delivery pathways when switching colors in a printer system.

The inks may be employed in an apparatus for direct printing ink jet processes. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Alternatively, the inks can be employed in indirect (offset) printing ink jet applications, wherein when droplets of the melted ink are ejected in an imagewise pattern onto a recording substrate, the recording substrate is an intermediate transfer member and the ink in the imagewise pattern is subsequently transferred from the intermediate transfer member to a final recording substrate.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, glossy coated papers such as XEROX® Digital Color Gloss, Sappi Warren Papers LUSTROGLOSS®, and the like, PASADENA LITHO LABEL® paper, transparency materials, fabrics, textile products, plastics, polymeric films, inorganic substrates such as metals, ceramics, wood, and the like.

Following formation on the substrate, the image on the substrate is exposed to curing energy, for example heat or radiation having an appropriate wavelength, mainly the wavelength at which the ink initiator absorbs radiation, to initiate the curing reaction of the ink. Radiation exposure need not be long, and may be for, for example, about 0.05 to about 10 seconds, more such as about 0.2 to about 5 seconds. These exposure times are more often expressed as substrate speeds of the ink passing under a UV lamp. The radiation to cure the polymerizable components of the ink can, for example, be provided by a variety of possible techniques, including, for example, a xenon lamp, laser light, D or H bulb. The curing light may be filtered, if desired or necessary. The curable components of the ink react to form a cured or crosslinked network of appropriate hardness. In embodiments, the curing is substantially complete when at least 75% of the curable components are cured (polymerized and/or crosslinked), to allow the ink to be substantially hardened, and thereby to be much more scratch resistant, and also to adequately control the amount of showthrough on the substrate.

Examples are set forth hereinbelow and are illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

A CYM series of curable phase change inks were formulated according to Table 1. The pigment dispersion of Table 1 is either a cyan, magenta or yellow concentrate prepared by ball milling the pigment in dispersant and optionally reactive diluents, as described in co-pending application Ser. No. 12/946,560 (entitled "Pigment Dispersion and Curable Phase Change Inks Containing The Same" to Keoshkerian et al. and filed on even date herewith), but any suitable process for preparing a stable dispersion can be used.

TABLE 1

| Component | Weight Percent |
|---|---|
| Gelling Agent[1] | 7.5% |
| Acrylated Wax (UNILIN 350-acrylate)[2] | 5.0% |
| Acrylated Monomer (SR9003) | 54.8% |
| Multifunctional Monomer (SR399LV) | 5.0% |
| IRGACURE 379 | 3.0% |
| IRGACURE 819 | 1.0% |
| IRGACURE 127 | 3.5% |
| Stabilizer IRGASTAB UV10 | 0.2% |
| Pigment Dispersion 15% wt pigment in EFKA 4340 Dispersant[3] | 20.0% |
| Total | 100.0% |

[1]The gelling agent was prepared as described in Example VIII of U.S. Pat. No. 7,279,587.
[2]The UNILIN 350-acrylate was prepared as described in U.S. Pat. No. 7,559,639, incorporated herein by reference.
[3]The pigment dispersion was prepared as described in the co-pending Application to Keoshkerian et al.

The inks were combined in the weight ratios given in Table 2 and mixed with magnetic stirring at 85° C. to 90° C. for several minutes to provide the indicated custom colors. While Table 2 only describes mixing of subtractive primary colors, the mixtures can also include subtractive primary colors mixed with red, green and blue colors to effectively increase the achievable color gamut.

TABLE 2

| Ink Color | Cyan (parts) | Yellow (parts) | Magenta (parts) |
|---|---|---|---|
| Blue 1 | 1 | 0 | 1 |
| Blue 2 | 3 | 0 | 1 |
| Green 1 | 3 | 1 | 0 |
| Green 2 | 1 | 1 | 0 |
| Green 3 | 1 | 3 | 0 |
| Orange 1 | 0 | 3 | 1 |
| Orange 2 | 0 | 1 | 1 |
| Orange 3 | 0 | 1 | 3 |
| Purple 1 | 1 | 0 | 6 |
| Purple 2 | 1 | 0 | 3 |

Figure 2:
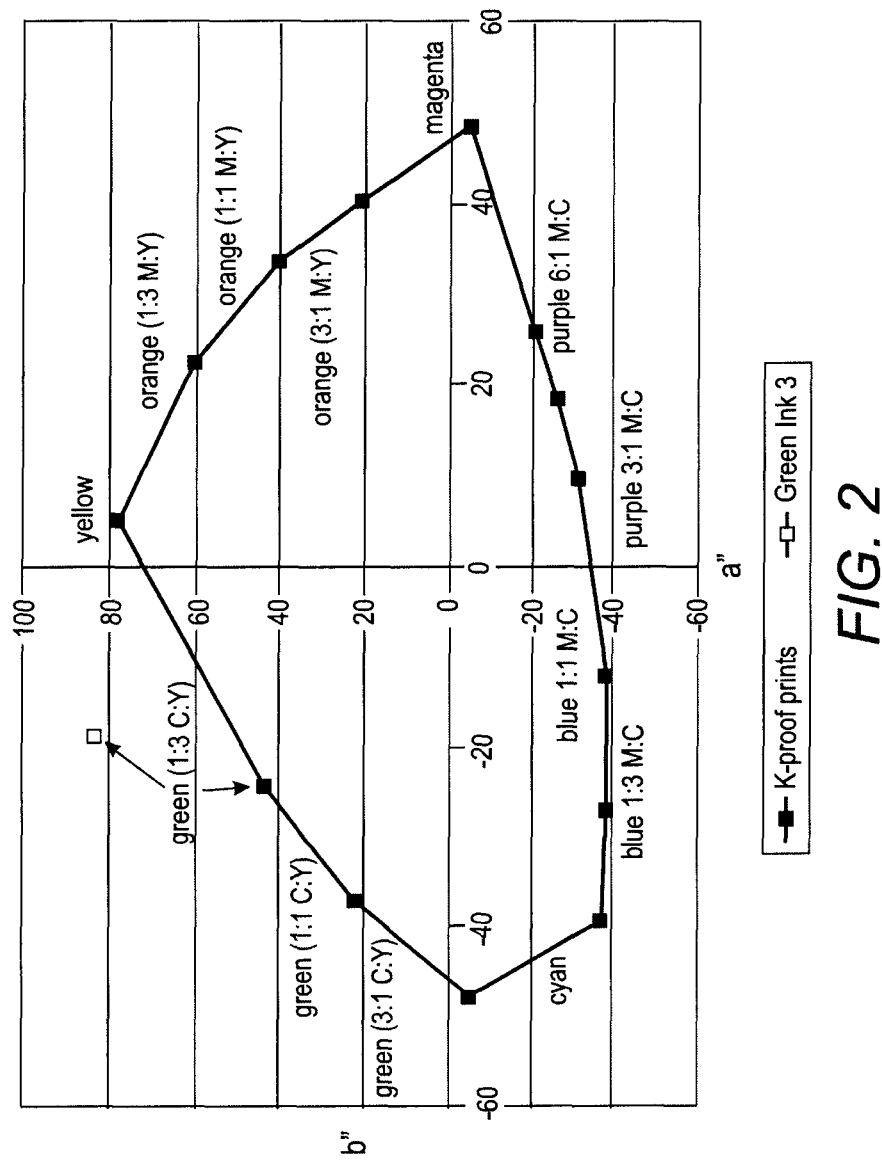
FIG. 2 is a graphical representation of the color properties a*, which represents a color value between red (positive value) and green (negative value), and b*, which represents a color value between yellow (positive value) and blue (negative value) measured and plotted for the melt mixed radiation curable phase change inks.

The resulting melt mixed inks exhibit the same robust characteristics as the component inks. The resulting inks are filterable to 1 μm, display Newtonian behavior at elevated temperature and are jettable at 85° C. Additionally, the dynamic temperature step rheology curves for the melt mixed and component inks are shown to overlap, as shown in FIG. 1. Each of the inks was K-proofed and the color properties were measured and shown in FIG. 2.

The Green 3 ink from Table 2 was printed on a Phaser 860 printer modified to jet the ink at 85° C. directly to paper and jetting was observed to be robust. The color measurements for Green 3 ink are plotted as a data point in FIG. 2. Phaser 860 is a commercially available Xerox printer.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An ink set comprising a plurality of differently colored curable phase change inks, wherein each colored ink of the ink set is comprised of an ink vehicle, a gelling agent, a pigment and a dispersant, wherein the dispersant is identical in each colored ink of the ink set and the dispersant is present in a substantially same amount in each colored ink of the ink set.

2. The ink set according to claim 1, wherein the dispersant is added to each colored ink of the ink set in about 20 to about 200% by weight relative to the pigment.

3. The ink set according to claim 1, wherein the dispersant is an amino acrylate block copolymer.

4. The ink set according to claim 1, wherein the ink vehicle is comprised of about 20% weight to about 90% weight of the ink of a curable monomer or oligomer, about 1% weight to about 30% weight of the ink of a gelling agent and about 1% weight to about 25% weight of the ink of a wax.

5. The ink set according to claim 1, wherein each ink of the ink set is further comprised of a photoinitiator, in an amount of from about 0.5% weight to about 15% weight of the ink.

6. The ink set according to claim 1, wherein the colored inks of the ink set comprise a yellow ink, a cyan ink and a magenta ink, and optionally a black ink, or a green ink, an orange ink and a violet ink, and optionally a white ink and/or a black ink.

7. The ink set according to claim 1, wherein the dispersant is an acrylic block copolymeric dispersant comprising a methoxypropanol solvent and having an amine value from about 2.5 to about 5.5 KOH/g, and wherein the dispersant is added to each colored ink of the ink set in about 20 to about 200% by weight relative to the pigment.

* * * * *